United States Patent [19]

Preissinger et al.

[11] 4,019,101

[45] Apr. 19, 1977

[54] CORROSION-RESISTANT REGENERABLE ELECTRICAL CAPACITOR

[75] Inventors: Karl-Heinz Preissinger, Taufkirchen; Walter Voelkl; Willi Weber, both of Munich; Ulrich Wehnelt, Starnberg, all of Germany

[73] Assignee: Siemens Aktiengesellschaft, Berlin & Munich, Germany

[22] Filed: June 26, 1975

[21] Appl. No.: 590,719

[30] Foreign Application Priority Data

June 27, 1974 Germany .......................... 2431013

[52] U.S. Cl. ................................................ 361/313
[51] Int. Cl.² ...................................... H01G 4/24
[58] Field of Search ........... 317/258, 261; 29/25.42

[56] References Cited
UNITED STATES PATENTS

| | | | |
|---|---|---|---|
| 2,978,908 | 9/1961 | Post | 29/25.42 |
| 3,857,074 | 12/1974 | Heywang | 317/258 |
| 3,955,127 | 5/1976 | Hunt | 317/258 |

*Primary Examiner*—E. A. Goldberg
*Attorney, Agent, or Firm*—Hill, Gross, Simpson, Van Santen, Steadman, Chiara & Simpson

[57] ABSTRACT

An electrical capacitor in which metallized foils are loosely disposed one on top of the other and in which the dielectric layer is formed of materials which have desirable electrical properties but which are not particularly adapted to regeneration having a metallized surface which is insulated against the moisture by a liquid insulating oil. The insulating oil layer may consist of polyisobutylene or a silicone oil. A solvent is used to apply the oil and the solvent is given the opportunity to evaporate after the application.

4 Claims, 1 Drawing Figure

U.S. Patent
April 19, 1977
4,019,101
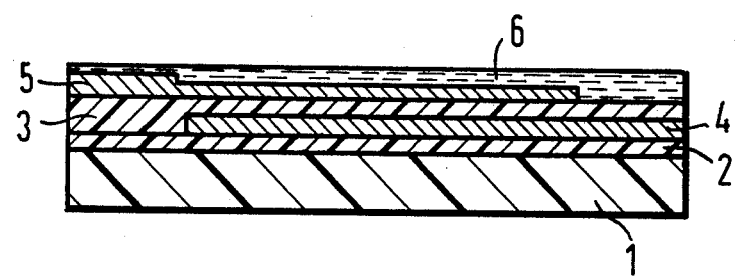

CORROSION-RESISTANT REGENERABLE ELECTRICAL CAPACITOR

BACKGROUND OF THE INVENTION

1. Field of the Invention

The field of art to which this invention pertains is electrical capacitors having means to reduce moisture penetration therein and in particular to capacitors which utilize moisture insulating coatings.

2. Description of the Prior Art

A capacitor is patented in the U.S. Pat. No. 3,857,074 wherein protection against corrosion is effected by a lacquer layer, as long as there is no voltage load. However, electrochemical corrosion effects occur despite such protection by lacquer layers if the capacitors are stored in humid conditions under voltage loading. This applies basically to solid protective layers.

SUMMARY OF THE INVENTION

An important feature of the present invention is to provide an improved corrosion-resistant regenerable electrical capacitor.

Another feature of the present invention is to provide a capacitor which is resistant to the penetration of moisture.

It is a further feature of the present invention to provide a capacitor wherein the surface of the metallizations not adhered to plastic layers is coated with an insulating oil.

It is also an object of the present invention to provide a capacitor as described above wherein the insulating oil consists of polyisobutylene.

It is a further object of the present invention to provide a capacitor of the type described above wherein the insulating oil is a silicone oil.

It is another feature of the present invention to provide a capacitor of the type described above wherein the insulating oil includes petroleum jelly.

It is another feature of the present invention to provide a capacitor as described above wherein the insulating oil is diluted with partially or fully halogenated hydrocarbon compound serving as a solvent and wherein the final coating is achieved by evaporation of the solvent.

These and other objects, features and advantages of the present invention will be understood in greater detail from the following description and in the associated drawing wherein reference numerals are utilized to designate a preferred embodiment.

BRIEF DESCRIPTION OF THE DRAWING

The single drawing in the present application is a cross section of a capacitor according to the present invention showing the metallization layers and the use of an insulating oil coating on the top surface of the upper metallization layer to protect against moisture penetration.

DESCRIPTION OF THE PREFERRED EMBODIMENT

The present invention relates to a corrosion-resistant, regenerable electrical capacitor in which the individual layers or windings are loosely disposed one on top of the other and in which the dielectric layer consist of materials having advantageous electrical properties but not particularly adapted to regeneration and wherein the metal surfaces, which are not connected with synthetic layers in an airtight manner, are covered with another different layer to provide protection against moisture penetration.

The present invention improves the protection against corrosion of metal surfaces under humid conditions with voltage loading, even if said metal surfaces are not tightly connected with synthetic layers.

This problem is solved according to the invention in the case of a capacitor of the initially described kind in that the layer insulating against moisture is a liquid insulating oil.

It is surprising that, up to significantly higher field intensities, practically no electrochemical corrosion occurs if the layer of insulating oil in accordance with the invention is used instead of a lacquer layer. This layer of insulating oil may be very thin; it thus makes possible, on the one hand, a good regenerating capability and, on the other hand, water can drain off quickly after the capacitor comes into a normal dry atmosphere. These advantages are apparent in the case of a stack or layer capacitor which has been separated from a mother capacitor with a large diameter. When the capacitor is separated the oil layer offers a further advantage in that the cutting edges resulting from the separation process are also coated and protected against moisture. If a capacitor without Schoop layers is contacted and held together only by connecting wires which are located parallel to the capacitor foils and are meeted-in perpendicularly to the extension of the foils, the pressure of the individual foils on one another is particularly low, and the present invention has an especially satisfactory effect.

The advantageous embodiment of the invention consists in the fact that the insulating layer consists of polyisobutylene. Also a silicone oil is well suited as insulating layer. The mentioned materials may also be mixed, and/or petroleum jelly with hard wax mixtures may be added.

A desirable method for producing a capacitor according to the invention is to apply the insulating oil in a diluted state with a partially or fully halogenated hydrocarbon serving as a solvent. This solvent must not attack the dielectric foil before removing it by evaporation. Recommended for this is, for example, the use of a solution consisting of 5% silicone oil in 1, 2, 2-trifluoro trichloroethane, which is applied onto the metallization. Furthermore, polyisobutylene may be applied in this manner in a suitable solvent, such as benzine.

The insulating layer may also be applied by means of rolls or in a vacuum by means of an oil evaporator immediately after the last metal coating is applied.

Referring to the single figure of the drawing, insulating layers 2 and 3 and a metallization 4 are applied onto a carrier foil 1, whereby the metallization 4 is protected on both sides by insulating layers 2 and 3 since said metallization 4 is hermetically connected with said insulating layers 2 and 3. The metallization 5 is protected against electrochemical corrosion by a layer 6 of insulating oil.

We claim as our invention:

1. A corrosion-resistant regenerable electrical capacitor comprising: a first metallized electrode hermetically connected to and sandwiched between two solid plastic dielectric layers, one of said dielectric layers being of weak regenerating characteristics, one of said dielectrics in contact with a carrier foil, the other dielectric having a second metallized electrode in capacitive relationship to said first metallized electrode, a major surface of said second metallized electrode being free of solid plastic and being coated with a liquid insulating oil.

2. A capacitor in accordance with claim 1 wherein the insulating oil layer is polyisobutylene.

3. A capacitor is accordance with claim 1 wherein the liquid insulating oil layer is a silicone oil.

4. A capacitor in accordance with claim 1 wherein the insulating oil layer includes petroleum jelly.